United States Patent [19]

Yates, IV

[11] Patent Number: 5,579,036
[45] Date of Patent: Nov. 26, 1996

[54] TOUCH SCREEN DEVICE AND SHIELDING BRACKET THEREFOR

[75] Inventor: Joseph W. Yates, IV, Duluth, Ga.

[73] Assignee: AT&T Global Information Solutions Company, Dayton, Ohio

[21] Appl. No.: 234,881

[22] Filed: Apr. 28, 1994

[51] Int. Cl.$^6$ .................................................. G09G 5/00
[52] U.S. Cl. ............................................ 345/173; 178/18
[58] Field of Search .................................. 345/173, 175; 178/18, 19; 200/5 A; 348/818, 819

[56] References Cited

U.S. PATENT DOCUMENTS

| | | | |
|---|---|---|---|
| 4,063,289 | 12/1977 | Veenendaal | 348/825 |
| 4,071,691 | 1/1978 | Pepper, Jr. | 178/19 |
| 4,129,747 | 12/1978 | Pepper, Jr. | 178/18 |
| 4,198,539 | 4/1980 | Pepper, Jr. | 178/18 |
| 4,293,734 | 10/1981 | Pepper, Jr. | 178/18 |
| 4,336,529 | 6/1982 | Buan | 200/5 A |
| 4,371,746 | 2/1983 | Pepper, Jr. | 178/18 |
| 4,675,569 | 6/1987 | Bowman et al. | 345/173 |
| 4,686,332 | 8/1987 | Greanias et al. | 178/19 |
| 4,686,576 | 8/1987 | Dickie et al. | 348/832 |
| 4,692,809 | 9/1987 | Beining et al. | 345/175 |
| 4,710,591 | 12/1987 | Rochester, Jr. | 348/818 |
| 4,771,277 | 9/1988 | Barbee et al. | 345/173 |
| 4,779,025 | 10/1988 | Paynton et al. | 345/173 |
| 4,799,083 | 1/1989 | Knodt | 355/200 |
| 4,816,811 | 3/1989 | Bogatin et al. | 178/18 |
| 4,853,497 | 8/1989 | Landmeier | 178/18 |
| 4,853,790 | 8/1989 | Dickie | 348/836 |
| 4,953,971 | 9/1990 | Highfill | 353/122 |
| 5,218,173 | 6/1993 | Garwin et al. | 178/18 |
| 5,357,061 | 10/1994 | Crutchfield | 178/18 |

FOREIGN PATENT DOCUMENTS

| | | | |
|---|---|---|---|
| 56-166543 | 12/1981 | Japan | 345/173 |
| WO93/13509 | 7/1993 | WIPO | 178/18 |

OTHER PUBLICATIONS

"Methods to Minimize the Effects of LCD M–Signal Noise on the Operation of an Attached Sensor Screen" IBM Technical Disclosure Bulletin, vol. 34, No. 7B, Dec. 1991.

*Primary Examiner*—Richard Hjerpe
*Assistant Examiner*—Amare Mengistu
*Attorney, Agent, or Firm*—Albert L. Sessler, Jr.; Paul W. Martin

[57] ABSTRACT

A bracket for shielding a capacitive touch screen from external noise arising from stray capacitance comprises upper and lower complementary rectangular conductive metal shield elements which are joined together inside a housing with a transparent touch screen retained therebetween. The upper shield element is provided with a large central aperture so that the touch screen is accessible to a user. The lower shield element is also provided with a large central aperture to enable a display, such as an LCD, to be viewed through the transparent touch screen. The display is secured to the lower shield element with an insulating member interposed between the display and the lower shield element. The shielding bracket provides a full shield for the upper, lower and edge surfaces of the touch screen to prevent the capacitance of a hand resting upon the housing from interfering with the touch screen.

19 Claims, 4 Drawing Sheets

TOUCH SCREEN DEVICE AND SHIELDING BRACKET THEREFOR

BACKGROUND OF THE INVENTION

The present invention relates to a touch screen device and more particularly to a shielding bracket used in the touch screen device to shield the touch screen from external noise due to stray capacitance.

Capacitive touch screens have become one of the major touch screen technologies in marketplaces such as the hospitality and quick-service point of sale marketplaces, mainly due to their extremely high durability and their resistance to interference from foreign objects on the screen, such as dirt and grease.

Capacitive touch screens calculate touch points by measuring the amount of current that the body of a user of the screen draws from the screen. This current drain is caused by capacitive coupling of the user's finger (and body) from a conductive film layered on the glass of the screen. A capacitor is defined as being two conductive surfaces separated by a thin insulating surface. In the case of a capacitive touch screen, as shown in FIG. 1, the two conductive surfaces are the user's finger 10 and a conductive coating 12 on the glass 14 of the touch screen. The insulating substance is a thin protective covering 16 layered on top of the conductive coating 12. This combination forms a capacitor, represented symbolically in FIG. 1 by the capacitor 18.

The touch point is calculated by measuring the current drain at the four corners of the touch screen. The closer a user's touch is to a corner, the more current drain will be measured from that corner. A microprocessor circuit compares the current drain from the four corners and calculates an X,Y coordinate for the touch point.

It is the fact that the hand does not actually touch the conductive coating that makes capacitive touch screens so durable, for reasons which include the following. The insulating coating can be made very strong so that it protects the conductive coating from scratching and wearing over time. Any foreign objects on the insulating coating (dirt, grease, etc.) will not degrade the performance of the touch screen. The touch screen assembly has no moving parts; therefore it can be sealed to the bezel of the touch screen device to prevent leakage of liquids into the device.

Unfortunately, it is also the characteristic that the hand does not touch the conductive coating that makes capacitive touch screens susceptible to interference. For example, as shown in FIG. 2, a left hand 20 of a user placed on the bezel 22 of a touch screen device 24 will induce enough stray capacitance to cause error, as shown by point 26, in the X, Y coordinates which are calculated by the system to represent a point 28 touched on the touch screen 30 by a finger 32 of the right hand 34 of the user.

The reason that the touch screen 30 so easily picks up the capacitance (C') of the hand 20 is that the active area of the touch screen 30 is only approximately 75% of the entire area of the glass. The 25% unused area of glass (hidden from view under the bezel 22) is required to distribute charge evenly throughout the conductive coating. Although this portion of the touch screen is unused, it is still sensitive to capacitance. Therefore it easily picks up the large capacitance of the hand 20 since only the thin bezel 22 separates the hand 20 from the glass of the touch screen 30.

Current methods to shield this sensitive unused portion of the touch screen 30 from stray capacitance induced by the hand 20 of a user of the touch screen device 24, which includes the touch screen 30 and an associated display 34, include covering the unused portion of the screen with a piece of conductive tape 33 beneath the bezel 22, as shown in FIG. 3, and then driving the tape with the same signal that is used to drive the four corners of the touch screen glass. Although the conductive tape certainly is an improvement over the unshielded glass, it still allows some stray capacitance to get through. Another problem is that the four wires that connect to the corners of the touch screen glass are also sensitive to stray capacitance, and the tape does not shield these wires at all.

SUMMARY OF THE INVENTION

The present invention provides an integrated display (such as an LCD) and a touch screen mounting bracket that completely shields the touch screen from external noise due to stray capacitance. This shielding bracket is superior to the conductive tape shielding method because it covers the touch screen in a "seamless" manner, thereby shielding the glass much more effectively, and it uses highly conductive rigid metal which increases the effectiveness of the shield. The unused glass of the touch screen under the bezel is shielded with conductive metal, the four signal wires are shielded, and the sides of the glass of the touch screen are shielded.

It is accordingly an object of the present invention to provide a novel and effective shielded capacitive touch screen device.

Another object is to provide a capacitive touch screen shield which includes two complementary conductive metal elements which are joined together with the touch screen therebetween.

Another object is to provide an integrated LCD and touch screen glass mounting bracket that completely shields the touch screen from external noise due to stray capacitance.

Another object is to provide a shield bracket which is effective to shield unused glass of the touch screen, signal wires which are coupled thereto and the sides of the touch screen glass.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
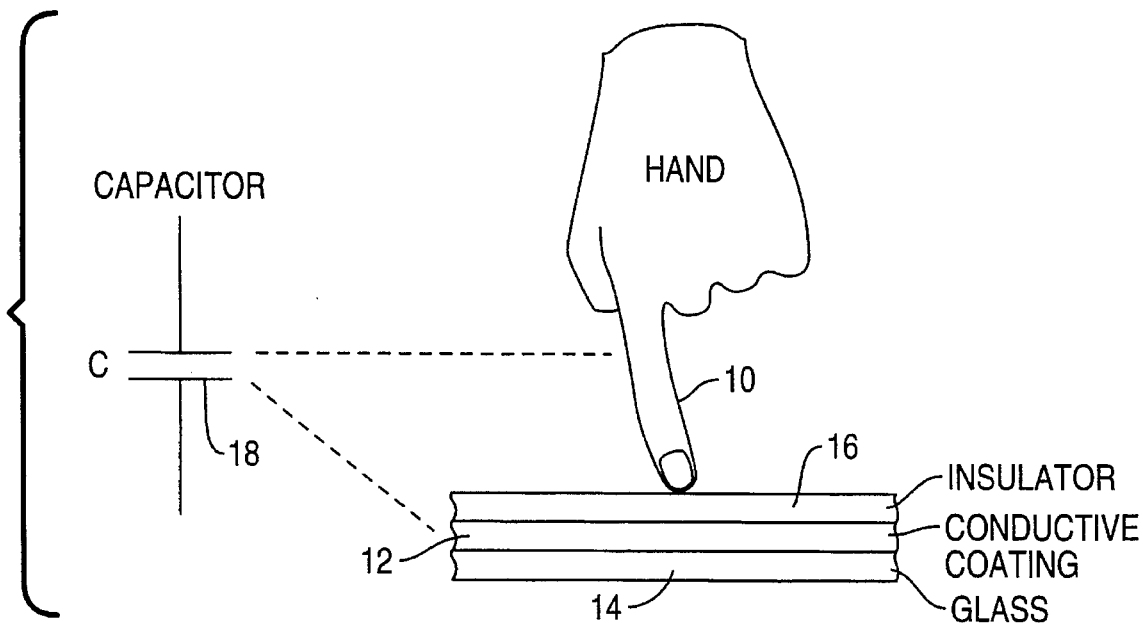
FIG. 1 is a diagrammatic view illustrating the operation of a capacitive touch screen.
Figure 2:
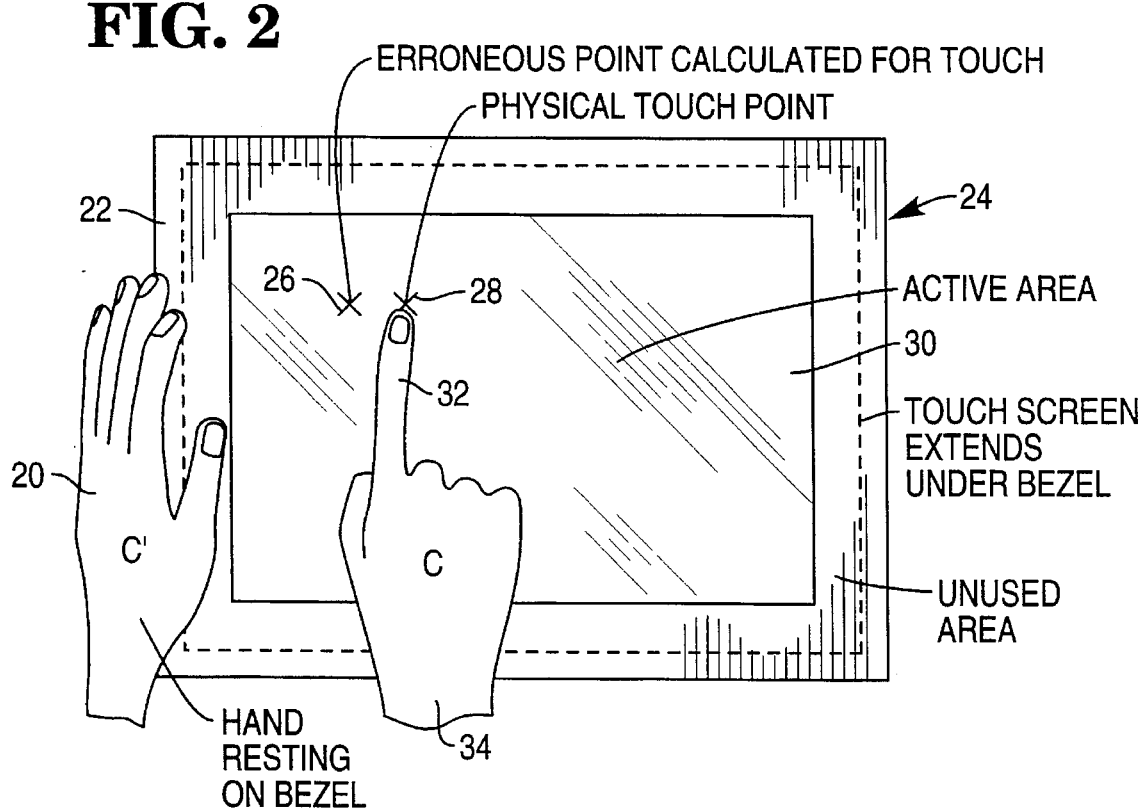
FIG. 2 is a diagrammatic view showing the manner in which errors are introduced in conventional capacitive touch screens when the hand of a user is inadvertently placed on the bezel of a touch screen device.
Figure 3:
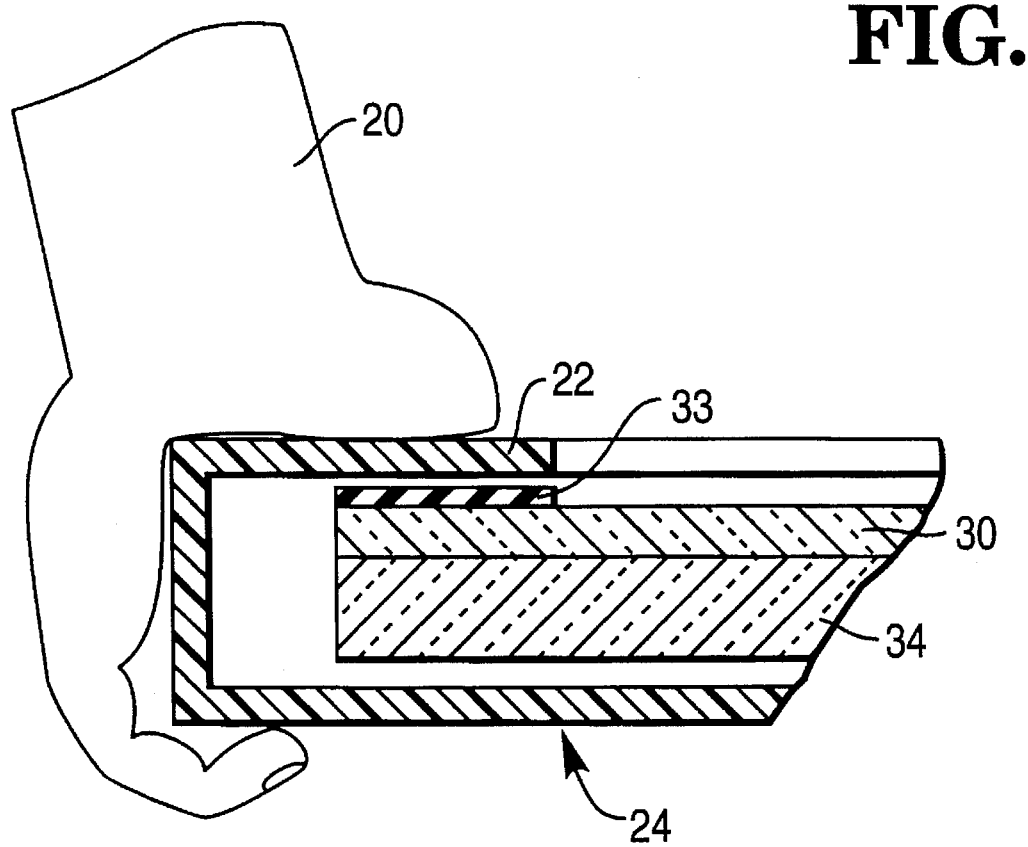
FIG. 3 is a partial sectional view of a prior art capacitive touch screen device, showing a tape shield employed therein.
Figure 4:
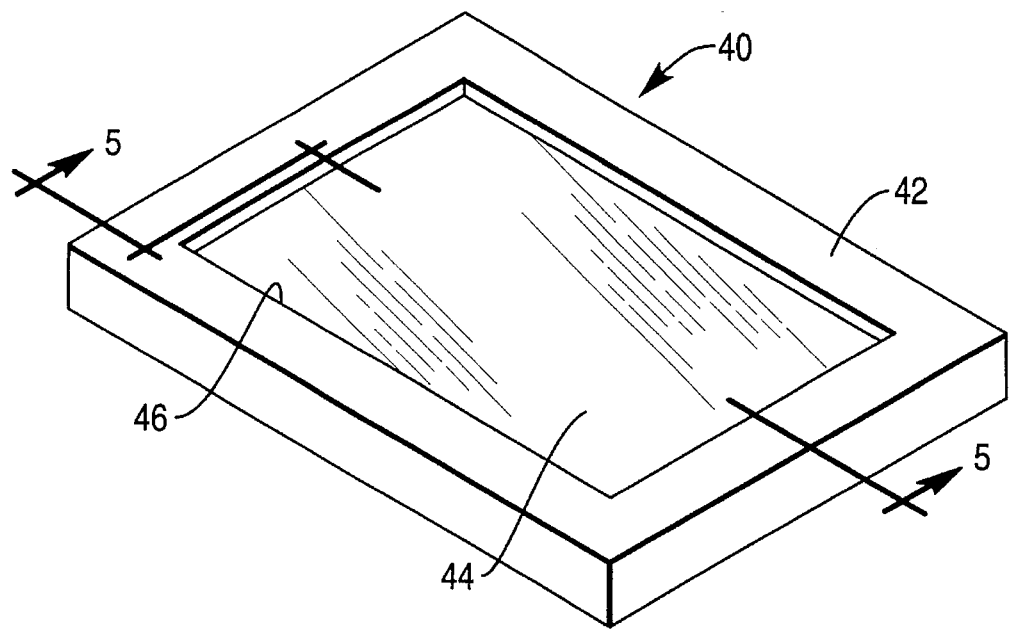
FIG. 4 is a perspective view of a touch screen device.

Referring now to FIG. 4, shown there is a touch screen device 40, which may comprise or be included as a part of a business terminal, comprising a bezel 42 and a touch screen 44, which is normally transparent to permit viewing of a display positioned beneath it. The bezel 42 includes an aperture 46 through which the touch screen 44 is accessible. Located beneath the touch screen 44 and not visible in FIG. 4 is a display 48 (FIG. 5), which typically may be a liquid crystal display (LCD). The internal structure of the device 40 is shown in FIG. 5, which is a partial sectional view taken along line 5—5 of FIG. 4.

Figure 5:
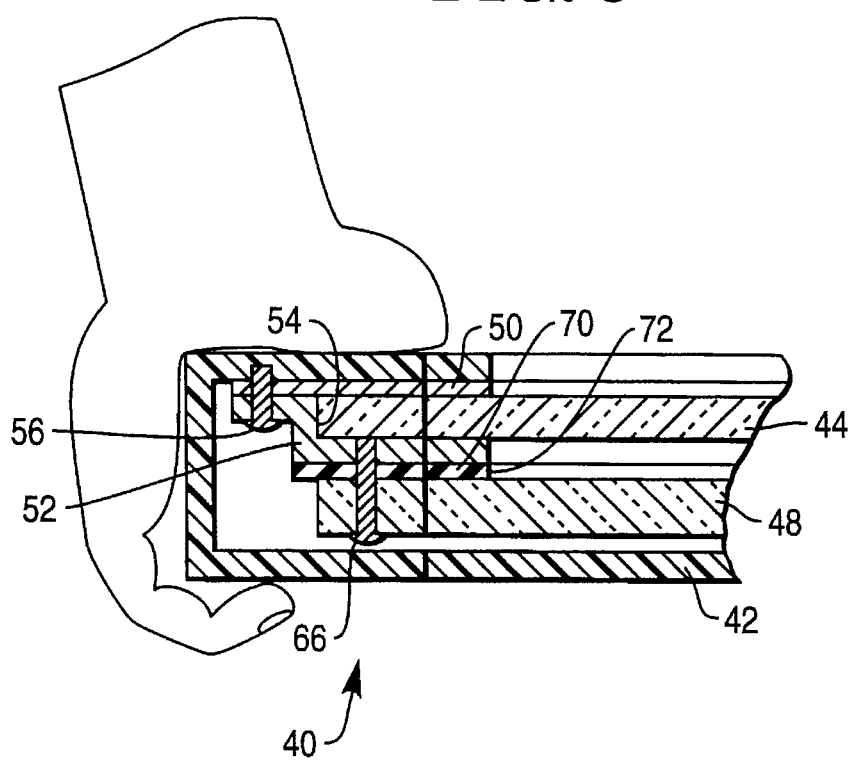
FIG. 5 is a partial sectional view, taken on line 5—5 of FIG. 4, of the capacitive touch screen device of the present invention.
Figure 6:
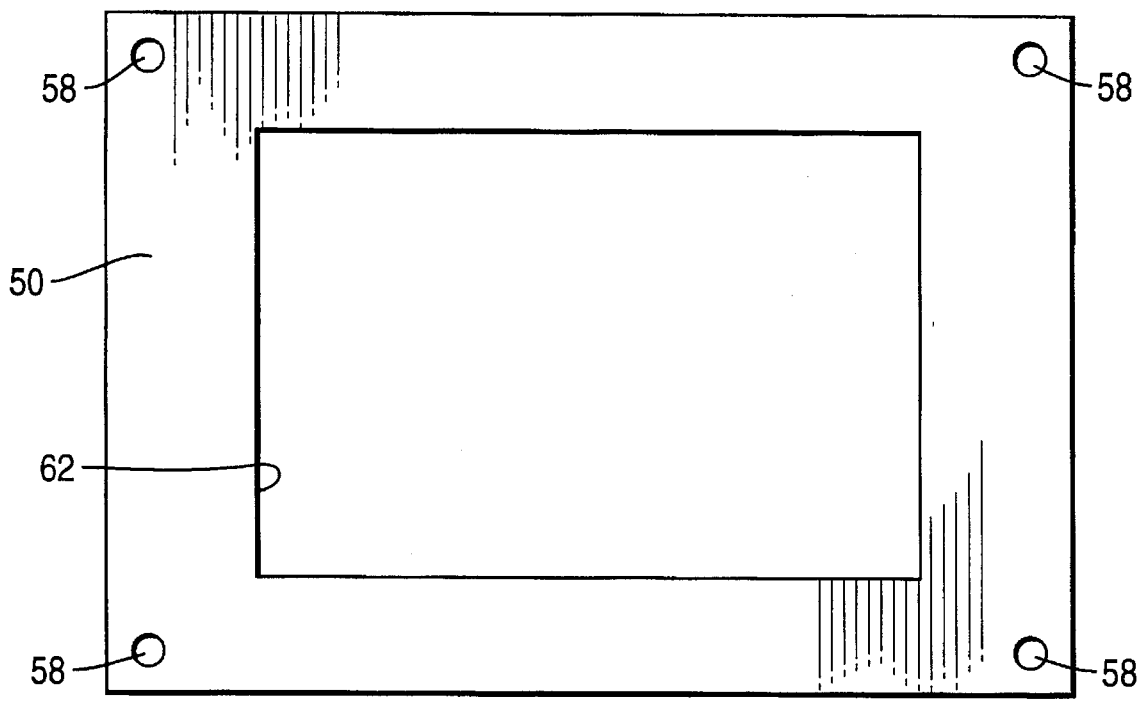
FIG. 6 is a plan view of the touch screen top shield of the touch screen device of the present invention.
Figure 7:
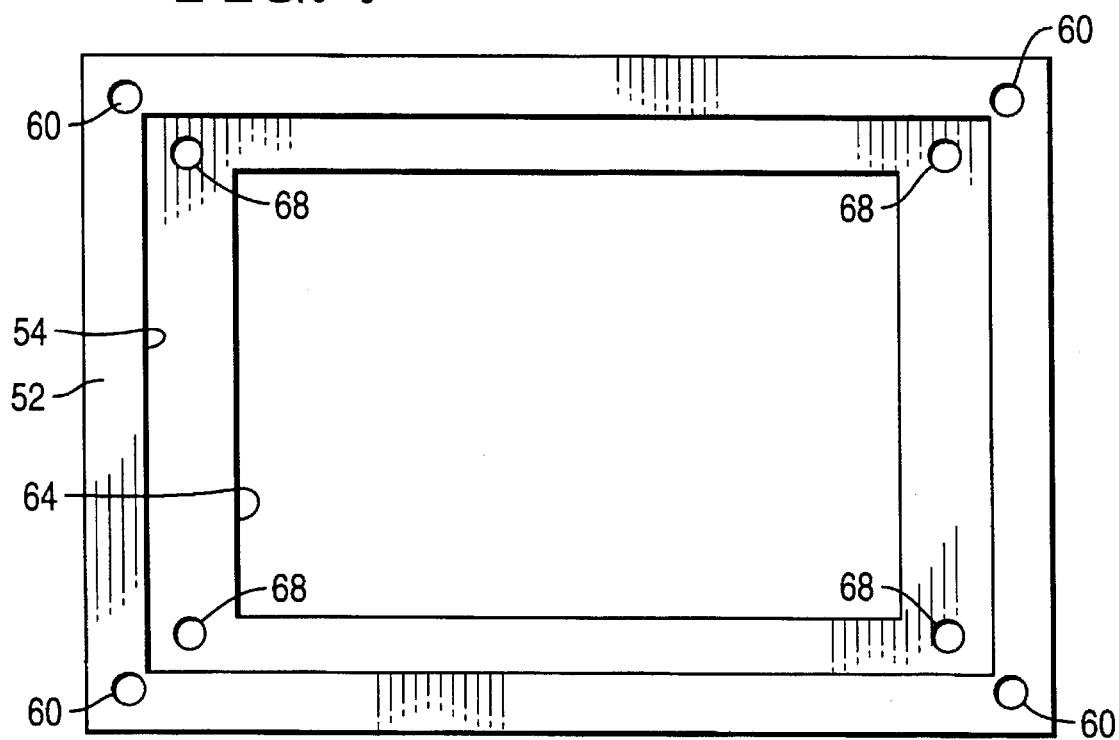
FIG. 7 is a plan view of the touch glass holder shield of the touch screen device of the present invention.

As shown in FIG. 5, the touch screen 44 is held in position in the interior of the device 40 by being placed between two shield elements, namely a touch screen top shield 50 (FIG. 6) and a touch screen holder shield 52 (FIG. 7). The shields may be made of any suitable conductive relatively rigid metal, such as aluminum or steel, and will most commonly be fabricated in a stamping operation. The touch screen holder shield 52 has an indented portion 54 to receive and retain in position the touch screen 44.

After the touch screen 44 has been inserted between them, the two shields 50 and 52 are held together by a plurality of studs, screws or other suitable fasteners 56, which also secure the assembled shields and touch screen to the bezel 42. The fasteners 56 extend through matching apertures 58 and 60 in the shields 50 and 52, respectively.

As shown most clearly in FIGS. 6 and 7, the two shields 50 and 52 are also provided with large central apertures 62 and 64, respectively. The aperture 62 provides access by a user to the touch screen 44, to enable it to be touched or otherwise written upon for the purpose of data entry. The aperture 64 in the shield 52 enables the display 48 to be seen from the exterior of the touch screen device 40 through the transparent touch screen 44. The display 48 is retained in operative relation to the touch screen 44 by a plurality of screws or other fasteners 66 made of suitable non-conducting material which extend through apertures in the display 48 and through apertures 68 in the touch screen holder shield 52. A rectangular insulating sheet 70 with a suitable rectangular aperture 72 is positioned between the shield 52 and the display 48 to provide the necessary electrical insulation between the shield and the display, and is provided with apertures through which the fasteners 66 extend.

The entire assembly of the shields 50 and 52, together with the touch screen 44, is driven with an electrical signal applied to the assembly. Insulated bushings and foam tape may also be used to keep the bracket or shield assembly from grounding the display 48. It will be seen that the shielding bracket comprising the shields 50 and 52 provides a full 180 degree shielding surface to prevent the capacitance of a user's hand resting on the side of the bezel from interfering with the touch screen 44, on the top, bottom or edge surfaces.

Although the invention has been described with particular reference to a preferred embodiment thereof, variations and modifications of the present invention can be effected within the spirit and scope of the following claims.

What is claimed is:

1. A capacitive touch screen shield, comprising:

a first shield element of rigid conductive material, having an upper surface and a lower surface, also having a central opening through which a touch screen positioned beneath the shield element is accessible, and having a peripheral portion which extends past the outer edges of the touch screen; and a second shield element of rigid conductive material which is located beneath the touch screen and supports the touch screen, the second shield element including an upturned portion which shields the edges of the touch screen, the second shield element having a flange portion extending outwardly of the upturned portion in a plane parallel to a plane through the first shield element for securing the second shield element to the lower surface of the first shield element.

2. The capacitive touch screen shield of claim 1, in which the first and second shield elements are generally rectangular in configuration.

3. The capacitive touch screen shield of claim 1, in which the second shield element has a central opening.

4. The capacitive touch screen shield of claim 3, in which said second shield element includes at least one mounting device for mounting a display.

5. The capacitive touch screen shield of claim 1, in which the first and second shield elements are aluminum.

6. The capacitive touch screen shield of claim 1, in which the first and second shield elements are steel.

7. The capacitive touch screen shield of claim 1, in which the first and second shield elements have the same external dimensions.

8. The capacitive touch screen shield of claim 3, in which the central openings of the first and second shield elements have the same dimensions.

9. The capacitive touch screen shield of claim 1, in which the second shield element is secured to the first shield element by a plurality of fasteners.

10. The capacitive touch screen shield of claim 9, in which said fasteners comprise screws which engage apertures in the first and second shield elements.

11. A touch screen device, comprising:

a top shield of conductive material of generally rectangular configuration, having an upper surface and a lower surface, and also having a central opening through which a touch screen positioned beneath the top shield is accessible;

a touch screen holder shield of conductive material having an upper surface and a lower surface, also having an indented portion for receiving and retaining a touch screen and a flange portion extending outwardly of the indented portion and in a plane defined by said upper surface, and a central opening in the indented portion through which a display positioned below the indented portion is visible, the flange portion of the holder shield being secured to the top shield;

a transparent touch screen located in the indented portion of the holder shield;

a bezel surrounding the peripheries of the top shield and the holder shield; and a display positioned beneath the holder shield and secured to the holder shield.

12. The touch screen device of claim 11, in which the top shield and the touch screen holder shield have the same external rectangular dimensions.

13. The touch screen device of claim 11, in which the central openings of the top shield and the touch screen holder shield have the same rectangular dimensions.

14. The touch screen device of claim 11, also including an insulating member located between the touch screen holder shield and the display.

15. The touch screen device of claim 14, also including a plurality of non-conducting fasteners for securing the display and the insulating member to the touch screen holder shield.

16. The touch screen device of claim 11, also including a plurality of fasteners for securing the top shield and the touch screen holder shield to the bezel.

17. The touch screen device of claim 11, in which the bezel encloses the top shield, the touch screen holder shield, the transparent touch screen and the display.

18. The touch screen device of claim 11, in which the display is a liquid crystal display.

19. The touch screen device of claim 11, in which the top shield and the touch screen holder shield are of rigid metal.

\* \* \* \* \*

UNITED STATES PATENT AND TRADEMARK OFFICE
CERTIFICATE OF CORRECTION

PATENT NO. : 5,579,036
DATED : November 26, 1996
INVENTOR(S) : Joseph W. Yates, IV It is certified that error appears in the above-indentified patent and that said Letters Patent is hereby corrected as shown below:

Column 3, line 64, after "screen" insert
--having outer edges--.

Signed and Sealed this

Sixth Day of January, 1998

Attest:

BRUCE LEHMAN

Attesting Officer     Commissioner of Patents and Trademarks